(12) United States Patent  
Schmidt

(10) Patent No.: US 6,234,067 B1  
(45) Date of Patent: May 22, 2001

(54) HINGE CLIP FOR ROASTER OVEN

(75) Inventor: Bruce E. Schmidt, Maribel, WI (US)

(73) Assignee: The Metal Ware Corporation, Two Rivers, WI (US)

(*) Notice: Subject to any disclaimer, the term of this patent is extended or adjusted under 35 U.S.C. 154(b) by 0 days.

(21) Appl. No.: 09/406,566

(22) Filed: Sep. 27, 1999

(51) Int. Cl.$^7$ .................................................. A21B 1/52
(52) U.S. Cl. .................... 99/426; 99/403; 126/275 R; 220/379
(58) Field of Search ............................ 99/426, 422, 403; 126/275 R; 220/379, 744

(56) References Cited

U.S. PATENT DOCUMENTS

| | | |
|---|---|---|
| 2,571,482 | 10/1951 | Pettit . |
| 3,081,394 | * 3/1963 | Arel et al. ......................... 220/379 X |
| 3,081,395 | * 3/1963 | Wickenberg ..................... 220/379 X |
| 3,576,271 | 4/1971 | Seeley . |
| 4,005,798 | * 2/1977 | Minsky ............................... 220/379 |
| 5,096,084 | 3/1992 | Wells . |
| 5,531,350 | 7/1996 | Lu . |
| 5,860,528 | 1/1999 | Emery . |

FOREIGN PATENT DOCUMENTS

| | | | |
|---|---|---|---|
| 1045617 | * 2/1956 | (DE) | ..................................... 220/379 |
| 77315 | * 5/1933 | (SE) | ..................................... 220/379 |

* cited by examiner

Primary Examiner—Reginald L. Alexander  
(74) Attorney, Agent, or Firm—Godfrey & Kahn, S.C.; William K. Baxter

(57) ABSTRACT

A two-piece container for preparing and cooking food, such as a roaster oven, includes a main body having a bottom portion with sidewalls extending upwardly therefrom and a separate removable cover for covering the main body of the container. The cover includes a hinge clip having a first portion attached to a rear sidewall of the cover, and a second portion extending outwardly and downwardly from the first portion for insertion into an elongated slotted opening extending through a flange surrounding the periphery of a cookwell pan inserted within the main body of the container. The hinge clip acts as a hinge when opening the cover, and becomes engaged within the slotted opening for supporting the cover in an open position. In alternative embodiments, the cover and cookwell pan may include brackets, or the cookwell pan may include a bracket for mating with an elongated slotted opening in a rear sidewall of the cover for maintaining the cover in an open position on the main body of the container.

22 Claims, 13 Drawing Sheets

Fig_3

FIG_6

FIG_8

FIG_10

FIG_12

mean, we…

HINGE CLIP FOR ROASTER OVEN

BACKGROUND OF THE INVENTION

The present invention relates to two-piece containers having a main body and a separate removable cover, and more particularly to a hinge clip attached to the removable cover of a roaster oven for supporting the cover in an open position on the main body of the roaster oven.

Roaster ovens used for preparing and cooking food are well known in the art. The conventional roaster oven includes a main body and a separate removable cover that fits on the main body of the oven. The main body typically includes a cookwell pan inserted within an outer shell of the roaster oven body. Handles are attached to the outer shell of the main body for ease in carrying the roaster oven. The cover is closed and rests on an upper edge of the cookwell pan during cooking, and to keep the food warm before serving. The cover is removed from the roaster oven during the serving of food.

A problem exists with having a separate removable cover. After the cover is removed from the roaster oven, it must be placed on a counter top, table, or other supporting surface. The cover is usually still hot and includes condensation and other food matter on its inner surface. Setting a hot, dirty cover on a counter top or table is not desirable. Hot liquid dripping from the inner surface of the cover onto the counter top or table could possibly damage or at the very least stain the supporting surface.

Therefore, it would be desirable if the cover of a roaster oven could be opened without having to remove the cover from the main body of the oven. In addition, it would be further desirable if the cover could be secured in an open position on the main body of the roaster oven such that any condensation or other food matter on the inner surface of the cover drips back into the cookwell pan of the roaster oven.

SUMMARY OF THE INVENTION

The present invention provides a hinge clip attached to the cover of a roaster oven. The hinge clip is designed so that the cover may be easily removed from the roaster oven with a normal lifting motion. The hinge clip acts as a hinge when the cover is opened and rotated about a rear lip on the bottom edge of the cover. The hinge clip also supports the cover in an open position. With the cover in an open position, the hinge clip positions the cover over the roaster oven to ensure that condensation and other food matter on the inner surface of the cover drips back into the roaster oven.

The present invention includes a two-piece container, such as a roaster oven, having a main body and a removable cover. The main body includes a bottom portion with sidewalls extending upwardly therefrom to create an open cavity for a cookwell pan to be inserted therein. Handles are attached to the sidewalls to facilitate carrying the roaster oven. The cookwell pan includes sidewalls with an upper edge and a flange extending around the periphery of the sidewalls. The cover includes a top portion with a handle attached thereto and sidewalls extending downwardly from the top portion. The cover's sidewalls include a flared bottom lip that rests on the upper edge of the cookwell pan's sidewalls with the cover in a closed position.

A hinge clip in accordance with the present invention is attached to the cover on a rear sidewall. The hinge clip is preferably attached to the sidewall by rivets, but may also be attached to the sidewall with screws or bolts and the like. In addition, the hinge clip may be welded to the sidewall or integral with the cover. The hinge clip includes a first portion attached to the rear sidewall of the cover and a second portion extending outwardly and downwardly from the first portion. The second portion of the hinge clip is sized and shaped to fit into an elongated slotted opening extending through the flange of the cookwell pan of the roaster oven.

With the cover in a closed position on the roaster oven, the hinge clip is not in contact with the cookwell pan or any other part of the main body of the roaster oven. The cover is easily removed from the main body of the roaster oven with a normal vertical lifting motion. The cover may be opened by lifting or rotating the cover about its rear bottom lip. Rotating the cover about its rear lip causes the hinge clip to be inserted within the corresponding elongated slotted opening in the flange of the cookwell pan. The hinge clip acts as a hinge while the cover is being opened. The hinge clip also supports the cover in an open position. In this secured open position, condensation and other matter on the inner surface of the cover drips back into the cookwell pan of the roaster oven, and not onto a counter top or table.

In an alternative embodiment, the cover and cookwell pan include brackets for selectively mounting the removable cover in an open position on the main body of the container. The cookwell pan includes at least one bracket attached to the rear flange extending upwardly therefrom for mating with at least one bracket attached to the rear sidewall of the cover. The at least one bracket attached to the rear flange of the cookwell pan includes a first portion and a second portion, the second portion narrower than the first portion for insertion into an elongated slotted opening in the at least one bracket attached to the rear sidewall of the cover. The at least one bracket attached to the rear sidewall of the cover extends outwardly and upwardly from the rear sidewall, and includes an elongated slotted opening extending therethrough for mating with the second portion of the bracket attached to the flange to maintain the cover in an open position.

In another alternative embodiment, the cookwell pan includes at least one bracket attached to the rear flange and extending upwardly therefrom for mating with at least one elongated slotted opening in the rear sidewall of the cover.

Various other features, objects, and advantages of the invention will be made apparent to those skilled in the art from the following drawings and detailed description of the invention.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
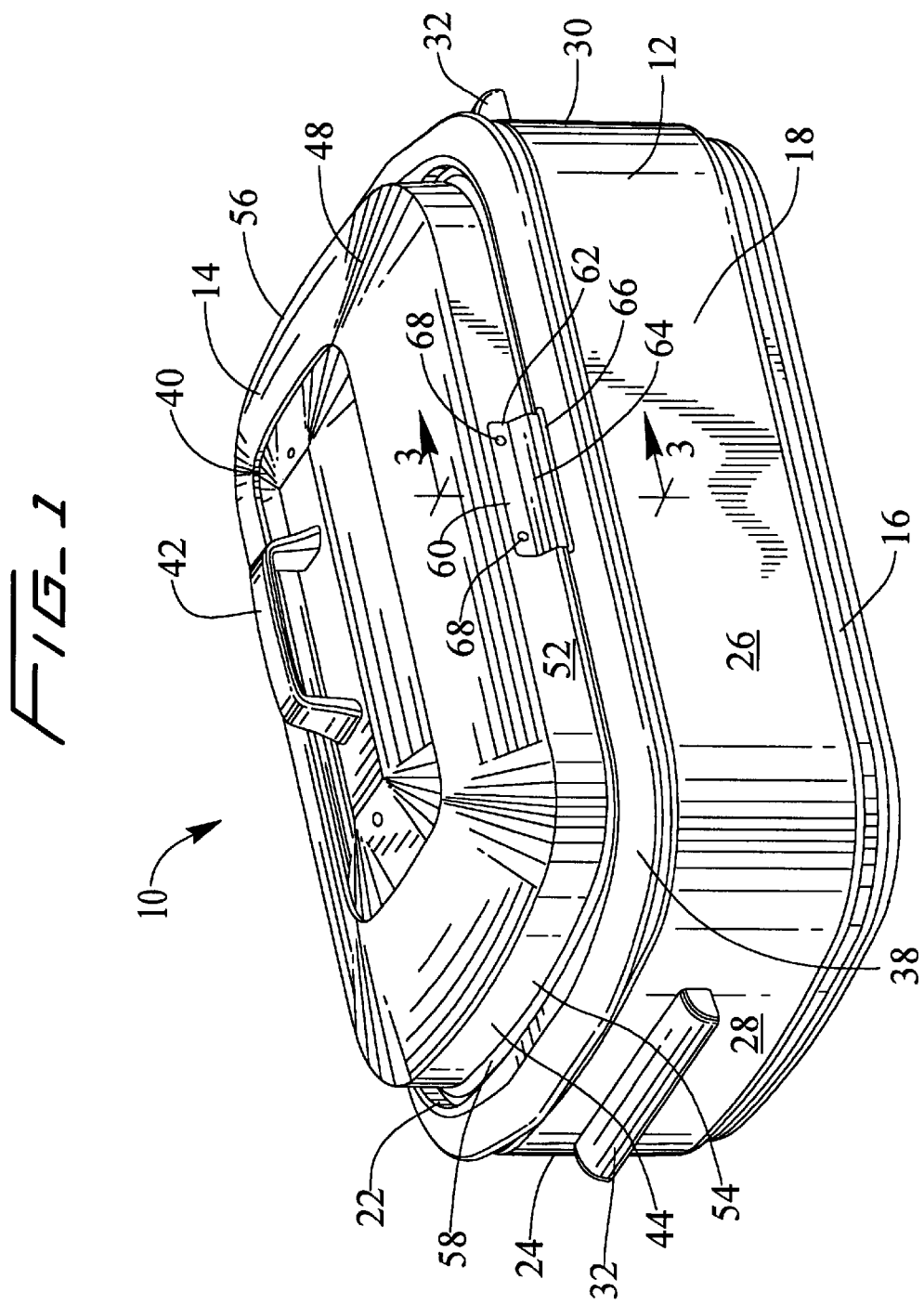
FIG. 1 is a perspective view of a two-piece roaster oven with a hinge clip attached to a removable cover in accordance with the present invention.
Figure 2:
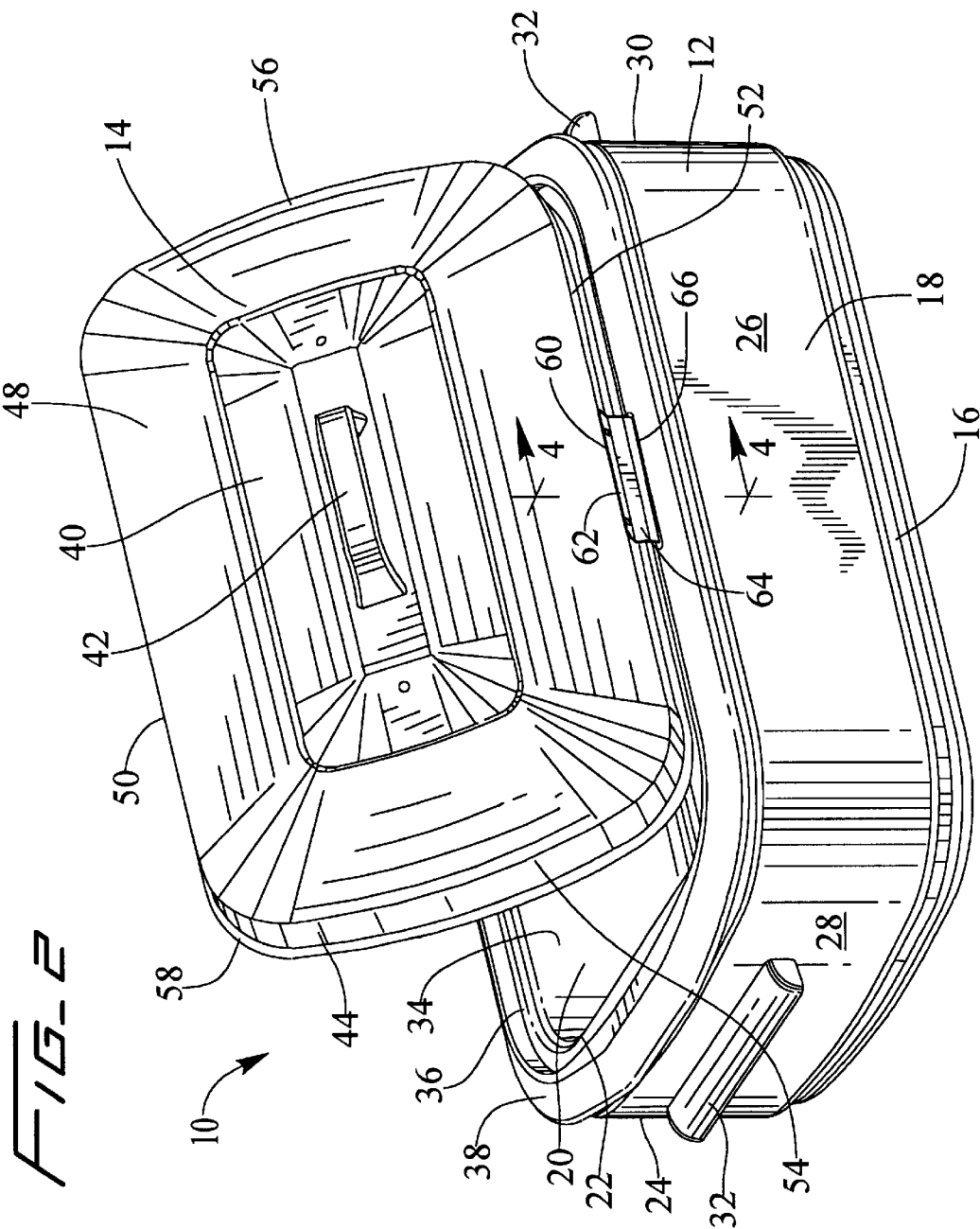
FIG. 2 is a perspective view of the roaster oven of FIG. 1, shown with the cover in an open position.

Referring now to FIGS. 1 and 2, a two-piece container 10 for preparing or cooking food, such as a roaster oven is shown. The two-piece container 10 includes a main body 12 and a removable cover 14. The main body 12 includes a bottom portion 16 with sidewalls 18 extending upwardly therefrom to create an open cavity 20 for a cookwell pan 22 to be inserted within the main body 12 of the container. The main body 12 of the container 10 is preferably rectangularly shaped with front and rear opposed sidewalls 24, 26 comprising the front and rear of the container, and two opposed end sidewalls 28, 30, which are generally shorter than front and rear sidewalls 24,26. The end sidewalls 28, 30 have handles 32 attached thereto for carrying the container 10. The main body 12 of the container 10 may also be oval-shaped, round, or square. The cookwell pan 22 includes sidewalls 34 with an upper edge 36 and a flange 38 extending around the periphery of the sidewalls 34.

The removable cover 14 includes a top portion 40 having a handle 42 attached thereto, and sidewalls 44 extending downwardly from the top portion 40. The handle 42 is used for lifting the cover 14 off of the main body 12 of the container 10. The top portion 40 and the sidewalls 44 are comprised of an inner surface 46 and an outer surface 48. The handle 42 is attached to the outer surface 48 of the top portion 40. The cover sidewalls 44 include front and rear opposed sidewalls 50, 52 and two opposed end sidewalls 54, 56 to correspond with the main body's sidewalls 18. The cover sidewalls 44 include a flared bottom lip 58 that rests on the upper edge 36 of the cookwell pan sidewalls 34 with the cover 14 in a closed position, as shown in FIGS. 1 and 3.

Attached to the rear sidewall 52 of the cover 14 is a hinge clip 60 for supporting the cover 14 in an open position on the main body 12 of the container 10. The hinge clip 60 includes a first portion 62 attached to the rear sidewall 52 of the cover 14, and a second portion 64 extending outwardly and downwardly from the first portion 62 for insertion in an elongated slotted opening 66 extending through the flange 38 of the cookwell pan 22. The second portion 64 of the hinge clip 60 is sized and shaped to fit into the elongated slotted opening 66 when opening the cover 14. The hinge clip 60 is preferably attached to the rear sidewall 52 by rivets 68. The hinge clip 60 may also be attached to the rear sidewall 52 with screws or bolts and the like. In addition, the hinge clip 60 may be welded to the rear sidewall 52 or integral with the cover 14.

Figure 3:
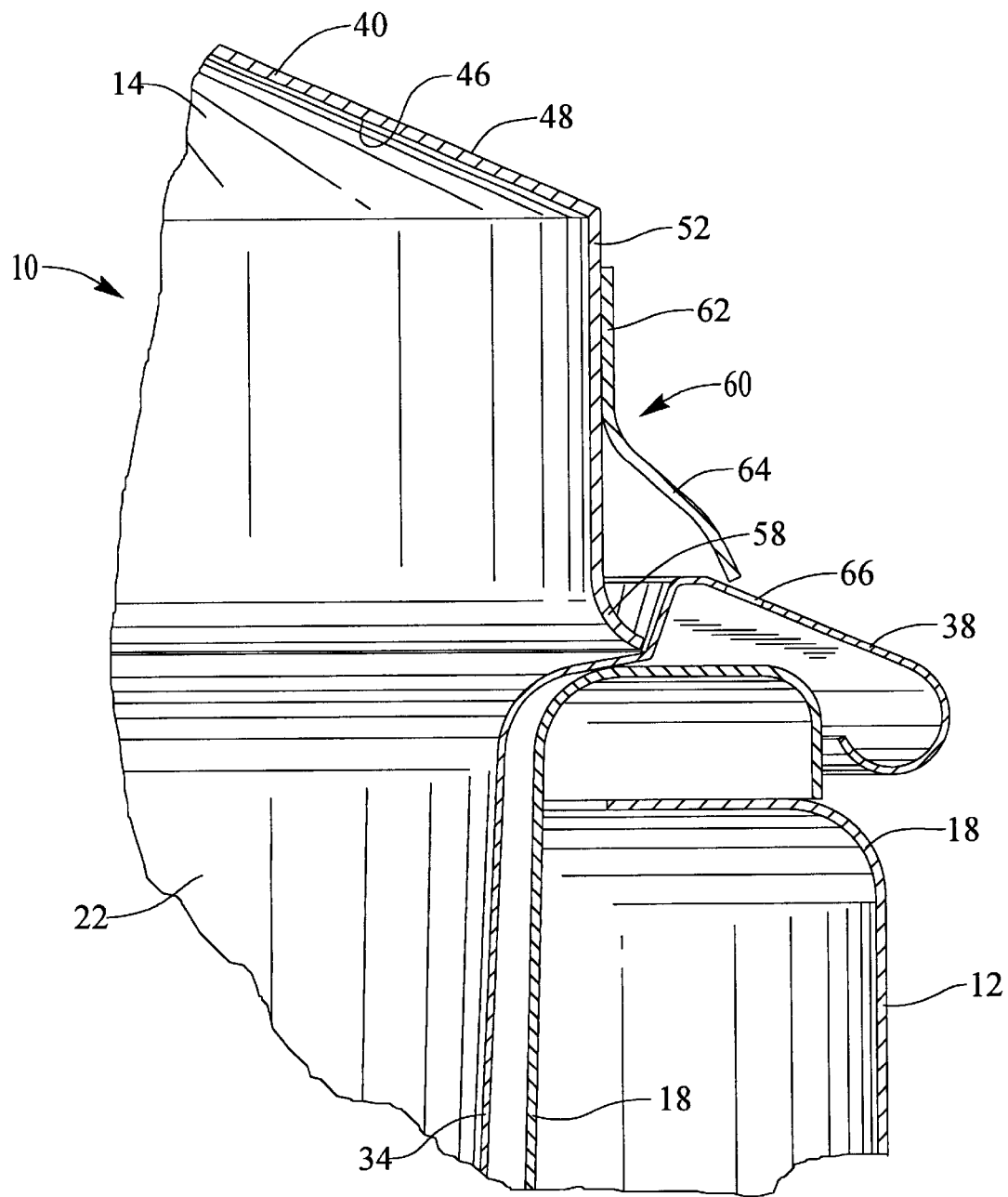
FIG. 3 is an enlarged cross-sectional view of the roaster oven with the cover in a closed position taken along line 3—3 of FIG. 1.

FIG. 3 shows an enlarged cross-sectional view of the container 10 of FIG. 1 with the cover 14 in a closed position atop the main body 12 of the container 10. As FIG. 3 illustrates, the first portion 62 of the hinge clip 60 is attached to the rear sidewall 52 of the cover 14. With the cover 14 in this closed position, the hinge clip 60 is not in contact with any portion of the main body 12 of the container 10. The cover 14 is easily removed from the main body 12 of the container 10 with a normal vertical lifting motion. The second portion 64 of the hinge clip 60 extends into the slotted opening 66. However, it is not necessary that the second portion 64 of the hinge clip 60 extend into the slotted opening 66, the second portion 64 of the hinge clip 60 may end just short of the slotted opening 66.

FIG. 2 illustrates the container 10 of the present invention with the cover 14 in an open position. The cover 14 is most typically opened by rotating the cover 14 about its rear edge or lip 58. By opening or rotating the cover 14 about its rear lip 58, the second portion 64 of the hinge clip 60 is inserted within and through the elongated slotted opening 66 in the flange 38. It should be noted, however, that nothing precludes the insertion of the hinge clip 60 into the opening 66 by a method other than rotation about the rear lip 58.

Figure 4:
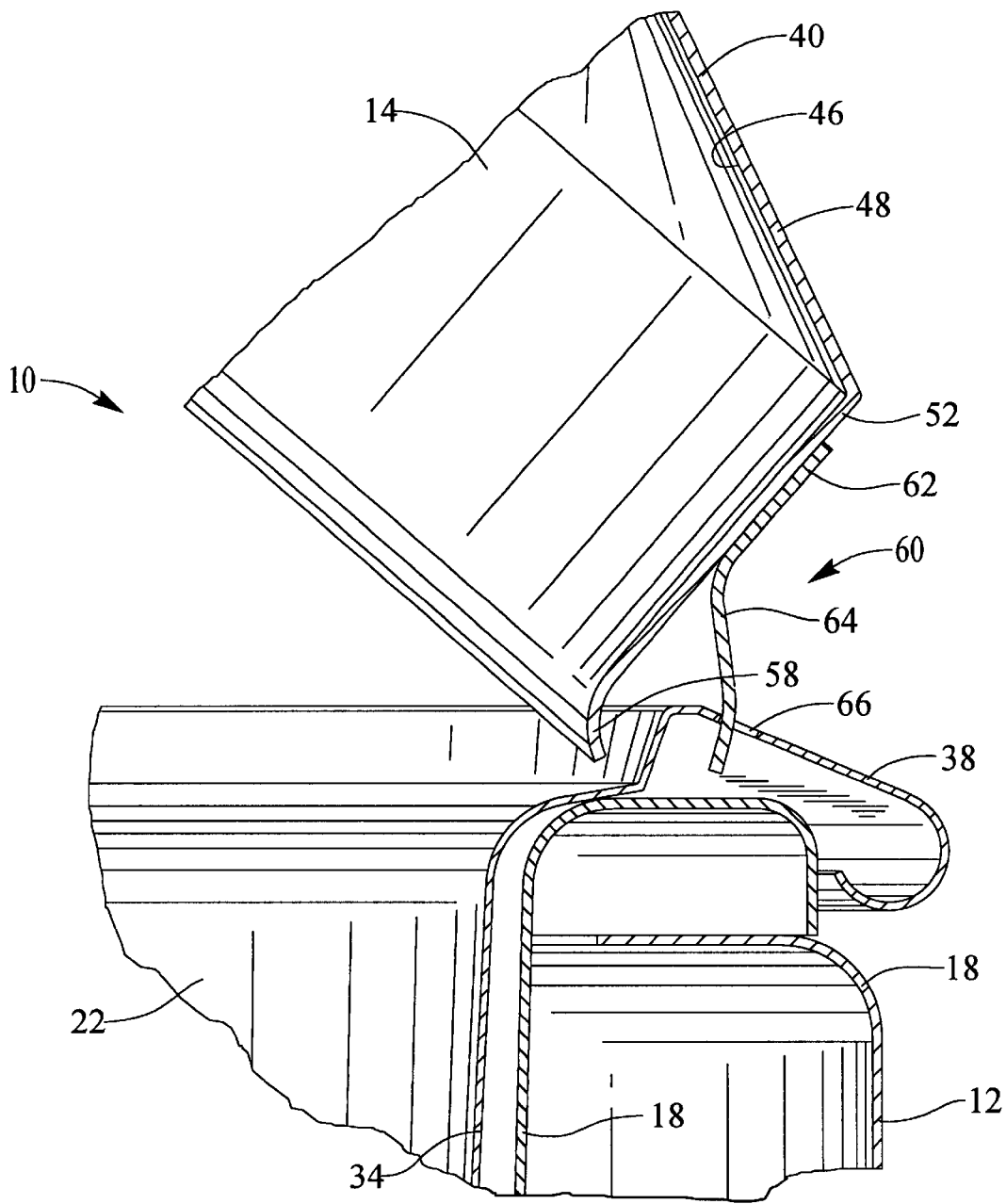
FIG. 4 is an enlarged cross-sectional view of the roaster oven with the cover in an open position taken along line 4—4 of FIG. 2.

FIG. 4 is a cross-sectional view of the container 10 as the cover 14 is being opened via the rotation method. The cover 14 is opened by lifting or rotating the cover 14 about its rear edge or flared bottom lip 58. Rotating the cover about the rear lip 58 causes the second portion 64 of the hinge clip 60 to be inserted within and through the corresponding elongated slotted opening 66 in the flange 38 of the cookwell pan 22. The hinge clip 60 is used to support the cover 14 in an open position.

Figure 5:
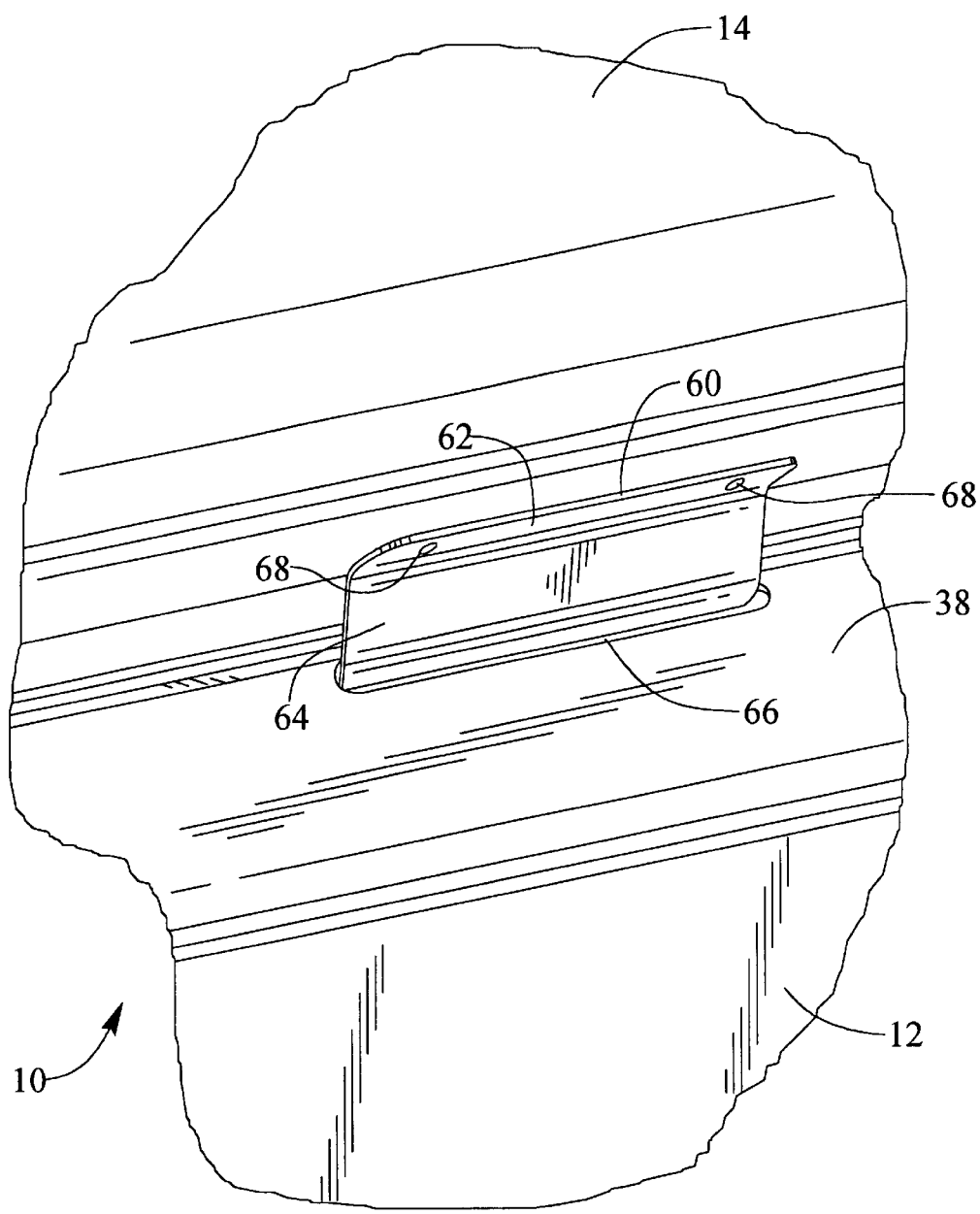
FIG. 5 is an enlarged fragmentary view of the hinge clip attached to the cover being inserted within a slotted opening in a flange surrounding the main body of the roaster oven.

FIG. 5 is an enlarged fragmentary rear view of the hinge clip 60 inserted within the elongated slotted opening 66 of the flange 38. The hinge clip 60 acts as a hinge while being inserted through the slotted opening 66 in the flange 38 of the cookwell pan 22. When the cover 14 is rotated about its rear lip 58, the second portion 64 of the hinge clip 60 is inserted into a corresponding slotted opening 66 extending through the flange 38 of the cookwell pan 22.

Figure 6:
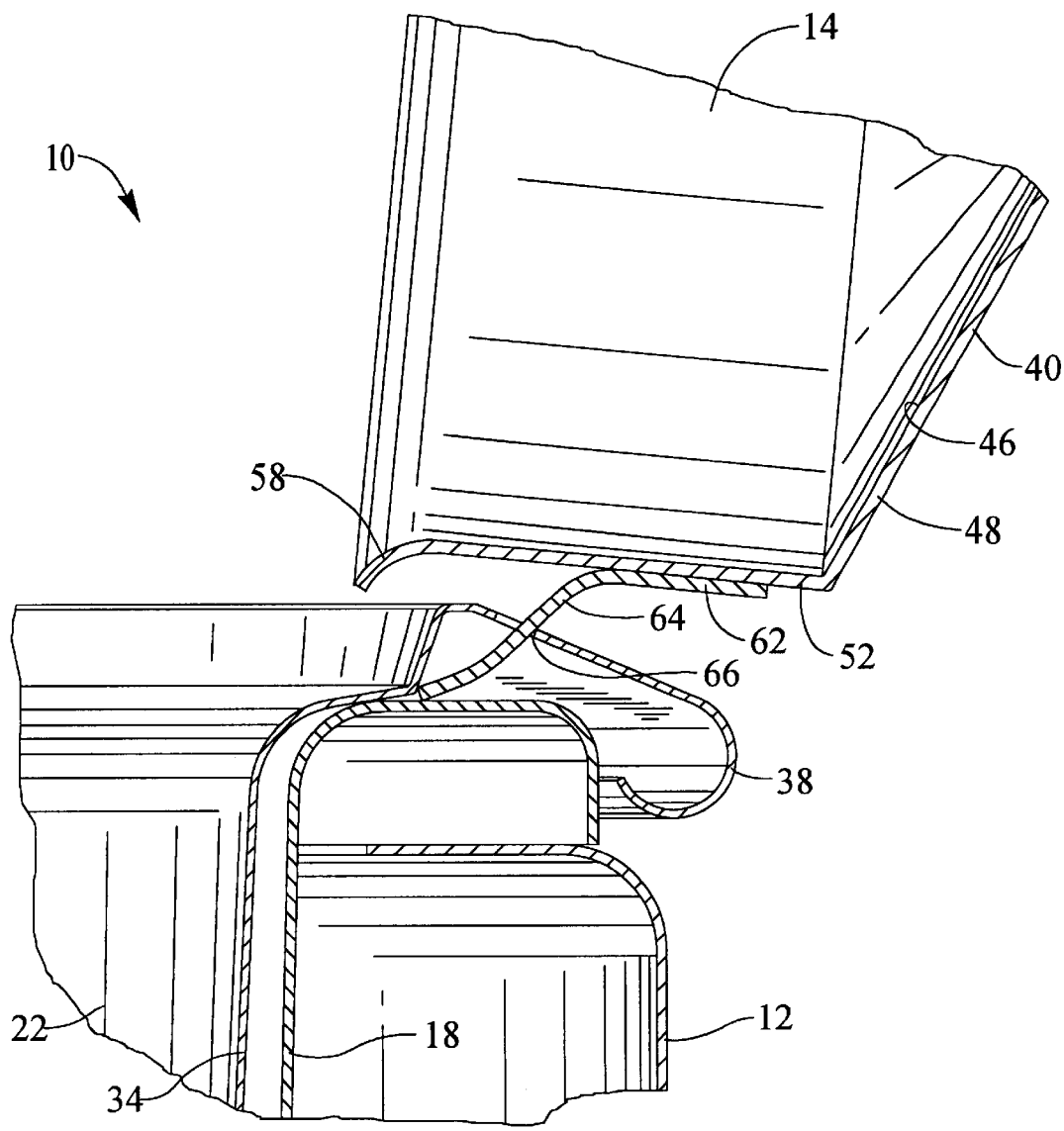
FIG. 6 is an enlarged fragmentary view of the hinge clip inserted within the slotted opening in the flange and supporting the cover in an open position.

FIG. 6 is an enlarged view of the hinge clip 60 inserted within the elongated slotted opening 66 of the flange 38, and supporting the cover 14 in an open position. The hinge clip 60 is engaged with the flange 38 to support the cover 14 in a fully open position. In this fully open position, the cover 14 is not in contact with any portion of the main body 12 of the container 10. While in this secured open position, the open cover 14 is positioned so that condensation and other matter on the inner surface 46 of the cover 14 drips back into the cookwell pan 22, and not onto a counter top or table.

Figure 7:
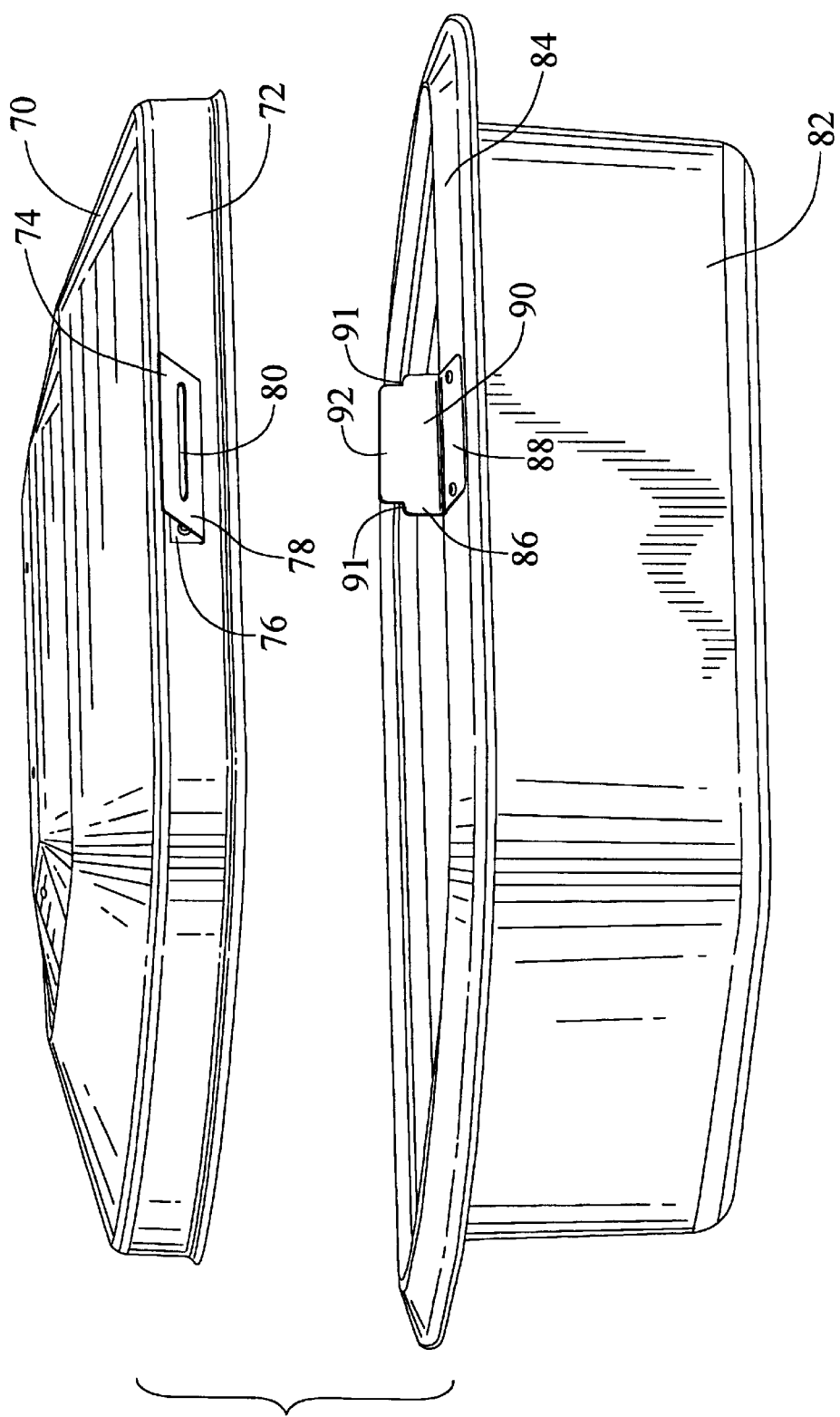
FIG. 7 is a perspective view of a two-piece roaster oven with a bracket assembly attached to a removable cover and a cookwell pan in accordance with a second embodiment of the present invention.
Figure 8:
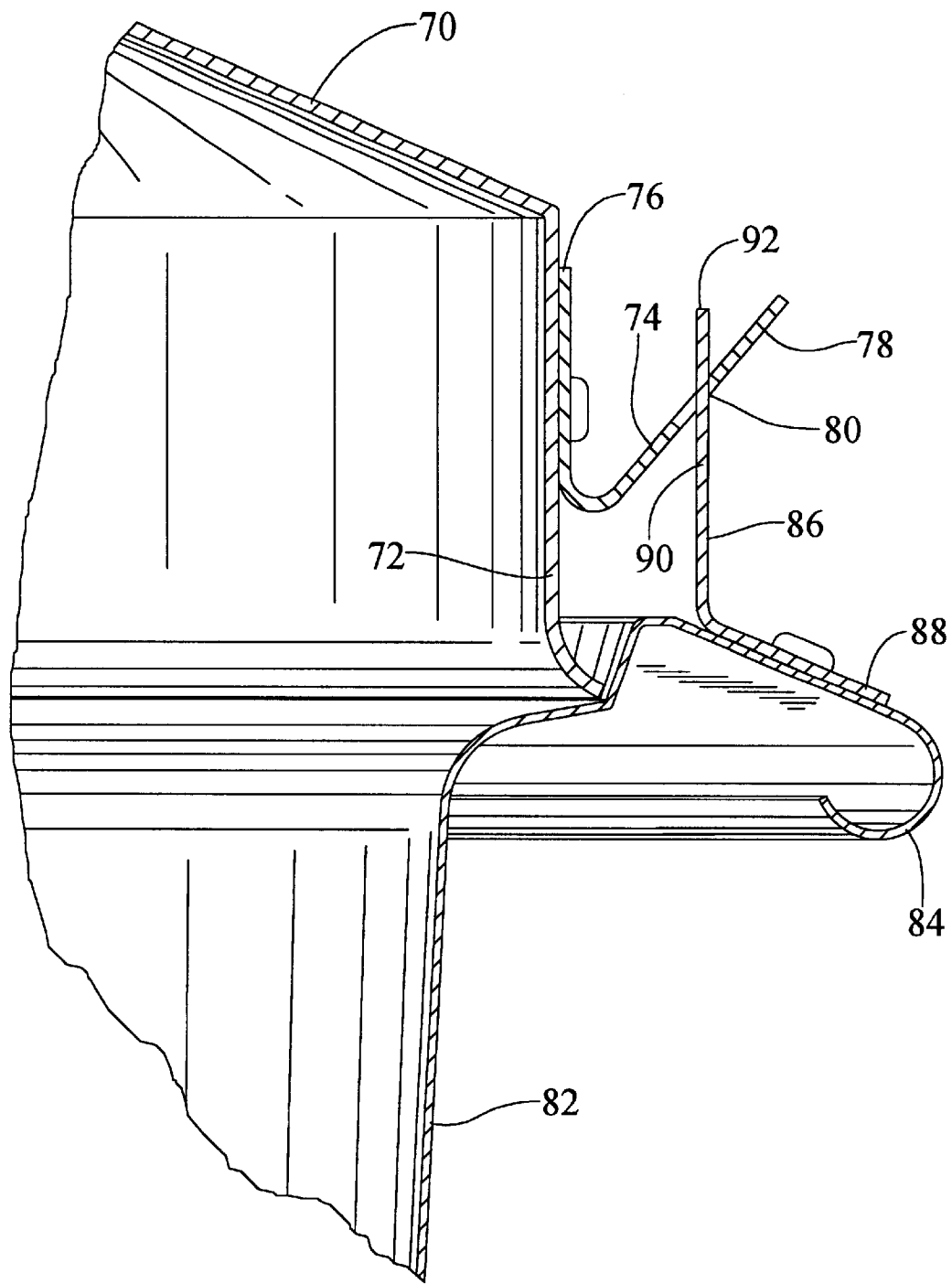
FIG. 8 is an enlarged cross-sectional view of the embodiment of FIG. 7 with the cover in a closed position.
Figure 9:
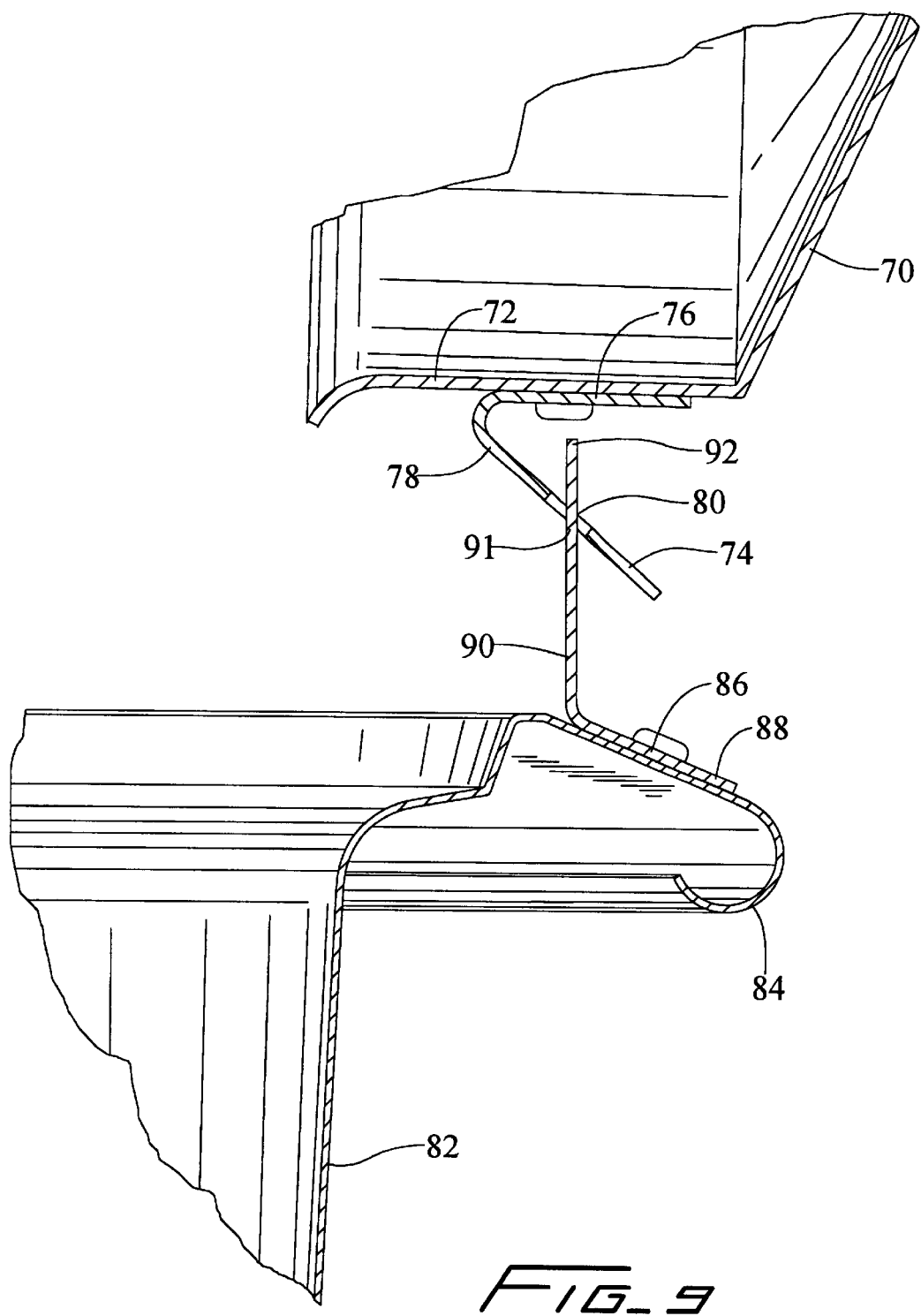
FIG. 9 is an enlarged cross-sectional view of the embodiment of FIG. 7 with the cover in an open position.
Figure 10:
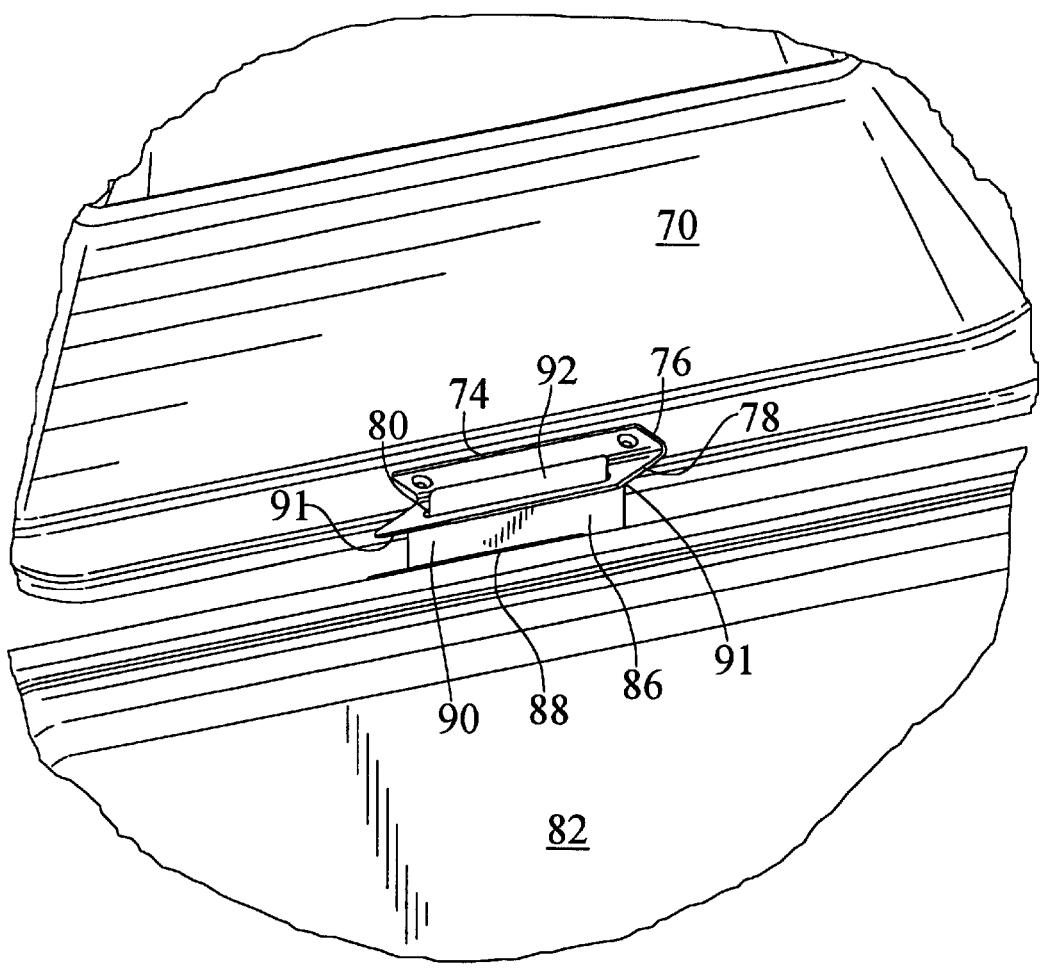
FIG. 10 is an enlarged fragmentary view of the bracket assembly of FIG. 7 supporting the cover in an open position.

FIGS. 7–10 illustrate a second embodiment of the present invention. FIG. 7 shows a twopiece roaster oven with a cover 70 and a main body 82. A rear sidewall 72 of the cover 70 includes a bracket 74 attached to the rear sidewall of the cover. The bracket 74 includes a first portion 76 attached to the rear sidewall 72 and a second portion 78 extending outwardly and upwardly from the first portion 76. The second portion 78 includes an elongated slotted opening 80 for mating with a bracket 86 attached to the flange 84 of a cookwell pan inserted within the main body 82 of the roaster oven. The bracket 86 includes a first portion attached to the flange 84, a second portion 90 extending upwardly from the first portion 88, and a third portion 92 extending upwardly from the second portion 90. The third portion 92 is preferably narrower than the second portion 90 for inserting into the elongated slotted opening 80 of bracket 74. FIG. 8 shows the cover 70 in a closed position on the main body 82 of the roaster oven. In this closed position, the third portion 92 of bracket 86 extends through the slotted opening 80 in bracket 74. FIGS. 9 and 10 show the cover 70 in an open position on the main body 82 of the roaster oven. In this position, the second portion 78 of the bracket 74 rests on inner shoulders 91 formed between the second portion 90 and the narrower third portion 92 to maintain the cover 70 in an open position.

Figure 11:
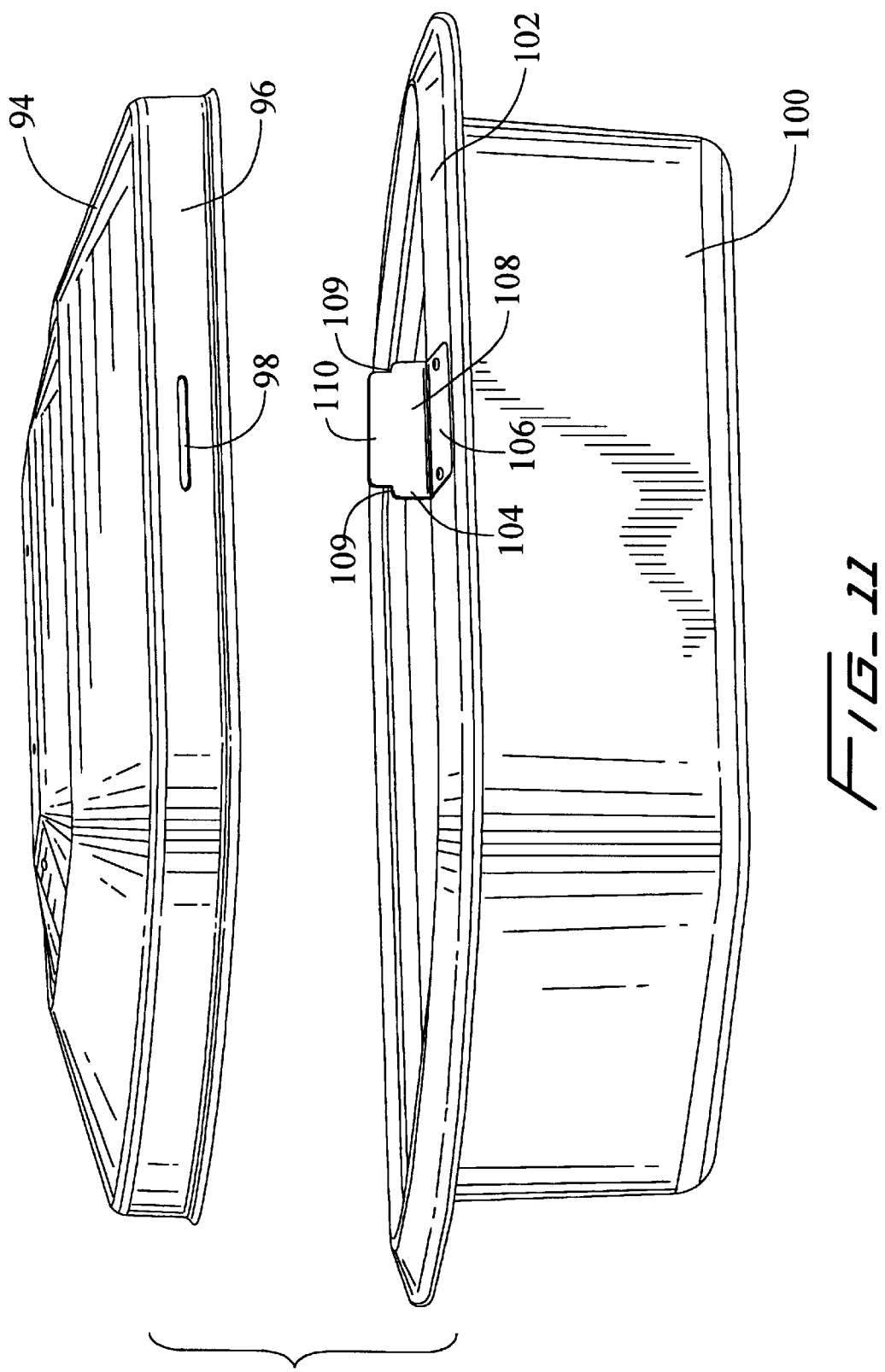
FIG. 11 is a perspective view of a two-piece roaster oven with a bracket assembly attached to a removable cover and a cookwell pan in accordance with a third embodiment of the present invention.
Figure 12:
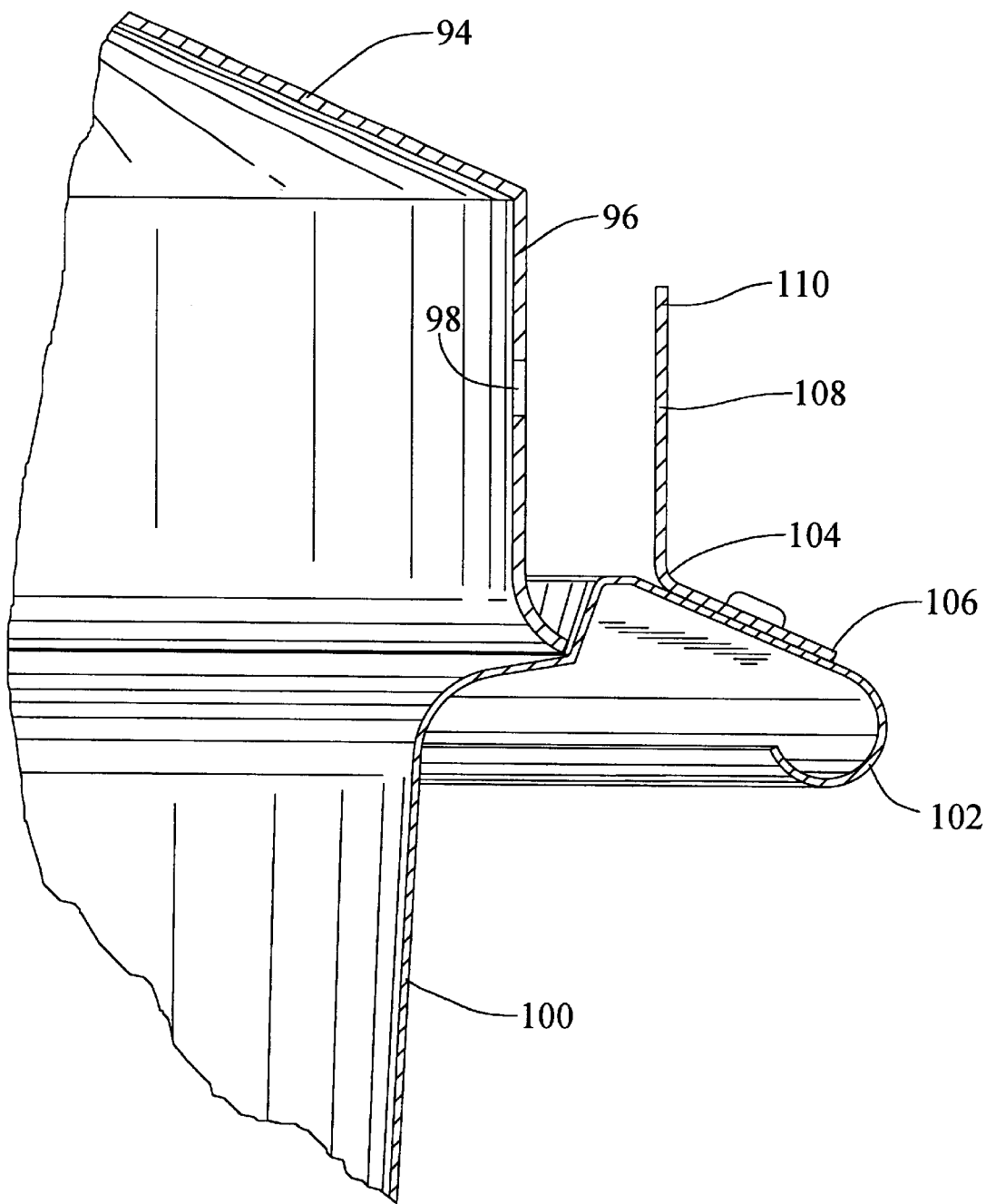
FIG. 12 is an enlarged cross-sectional view of the embodiment of FIG. 11 with the cover in a closed position.
Figure 13:
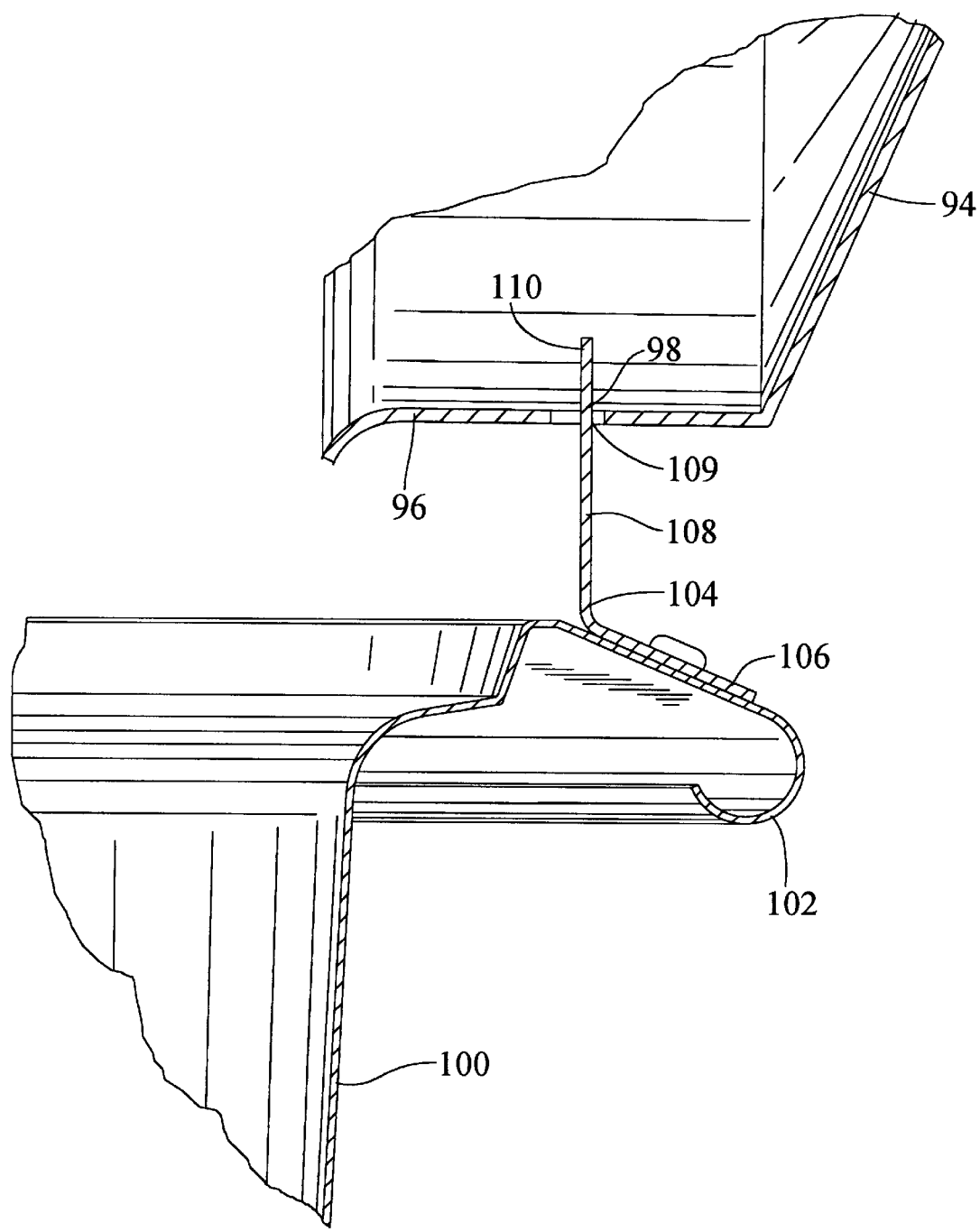
FIG. 13 is an enlarged cross-sectional view of the embodiment of FIG. 11 with the cover in an open position.

FIGS. 11–13 illustrate a third embodiment of the invention. FIG. 11 shows a two-piece roaster oven with a cover 94 and a main body 100. A rear sidewall 96 of the cover 94 includes an elongated opening 98 extending therethrough for mating with a bracket 104 attached to the 102 of a cookwell pan inserted within the main body 100 of the roaster oven. The bracket 104 includes a first portion 106 attached to the flange 102, a second portion 108 extending upwardly from the first portion 106, and a third portion 110 extending upwardly from the second portion 108. The third portion 108 is preferably narrower than the second portion 108 for insertion into the elongated slotted opening 98 in the rear sidewall 96 of the cover 94. FIG. 12 shows the cover 94 in a closed position on the main body 100 of the roaster oven. FIGS. 13 shows the cover 94 in an open position on the main body 100 of the roaster oven. In this position, the elongated slotted opening 98 rests on inner shoulders 98 formed between the second portion 108 and the narrower third portion 110 of bracket 104 to maintain the cover 94 in an open position on the main body 100 of the roaster oven.

While the invention has been described with reference to a preferred embodiment, those skilled in the art will appreciate that certain substitutions, alterations and omissions may be made without departing from the spirit of the invention. Accordingly, the foregoing description is meant to be exemplary only, and should not limit the scope of the invention set forth in the following claims.

I claim:

1. A two-piece cooking container comprising:
   a main body having a bottom portion with upwardly extending sidewalls and a flange extending around the periphery of the sidewalls;
   a removable cover for covering the main body of the container having a top portion with downwardly extending sidewalls and a bottom lip at the end of the sidewalls;
   at least one bracket attached to the cover, the bracket having a substantially flat first portion fastened to the cover, and a second portion extending outwardly and downwardly from the first portion; and
   at least one corresponding elongated slotted opening extending through the flange for receiving the second portion of the bracket therein, the second portion having an end that extends directly over the slotted opening when the cover is in a closed position on the main body of the container.

2. The cooking container of claim 1 wherein the bracket is not in contact with the main body of the container when the cover is in a closed position on the main body of the container.

3. The cooking container of claim 2 wherein the closed cover is removed from the main body with a normal vertical lifting motion.

4. The cooking container of claim 1 wherein the bracket acts as a hinge when opening the cover by rotating the cover about its rear bottom lip.

5. The cooking container of claim 4 wherein the second portion of the bracket is inserted through the elongated slotted opening when opening the cover.

6. The cooking container of claim 1 wherein the bracket becomes engaged within the slotted opening to maintain the cover in an open position.

7. The cooking container of claim 1 wherein the open cover is located above the main body of the container so that any condensation or other matter on the inner surface of the cover drips down into the main body of the container.

8. The cooking container of claim 1 wherein the bracket is a hinge clip fastened to the rear sidewall of the cover with rivets.

9. The cooking container of claim 1 wherein the bracket is a hinge clip welded to the rear sidewall of the cover.

10. A two-piece roaster oven having a main body with a bottom portion and upwardly extending sidewalls and a removable cover with a top portion and downwardly extending sidewalls, the roaster oven comprising:
    a flange extending around the upper peripheral edge of the sidewalls of the main body;
    at least one bracket attached to a rear sidewall of the cover, the bracket having a substantially flat first portion fastened to the rear sidewall of the cover, and a second portion extending outwardly and downwardly from the first portion; and
    at least one corresponding slotted opening extending through the flange for receiving the second portion of the bracket therein, the second portion having an end that extends directly over the slotted opening when the cover is in a closed position on the main body of the oven.

11. The roaster oven of claim 10 wherein the second portion of the bracket is inserted through the slotted opening by rotating the cover about a rear edge of the rear sidewall.

12. The roaster oven of claim 10 wherein the bracket supports the cover in an open position.

13. The roaster oven of claim 12 wherein the open cover is located above the main body of the oven so that any condensation or other matter on the inner surface of the cover drips down into the main body of the oven.

14. The roaster oven of claim 10 wherein the bracket is integral with the cover.

15. A two-piece roaster oven comprising:
    a main body having a bottom portion with upwardly extending sidewalls and a flange extending around the periphery of the sidewalls;
    a removable cover having a top portion with sidewalls extending downwardly from the top portion and an outwardly extending lip at the end of the sidewalls for mating with the body of the oven;
    at least one hinge clip attached to a rear sidewall of the cover, the hinge clip having a first portion attached to the rear sidewall, and a second portion extending outwardly and downwardly from the first portion; and
    at least one corresponding slotted opening for extending through the flange for receiving the second portion of the hinge clip therein, the second portion having an end that extends directly over the slotted opening when the cover is in a closed position on the main body of the oven.

16. The roaster oven of claim 15 wherein the second portion of the hinge clip is inserted into the slotted opening when opening the cover.

17. The roaster oven of claim 15 wherein the hinge clip inserted within the slotted opening maintains the cover in an open position.

18. The roaster oven of claim 17 wherein the open cover is positioned above the main body of the roaster oven so that any condensation or other matter on the inner surface of the cover drips down into the main body of the roaster oven.

19. A cooking device comprising:
   a cooking cavity;
   a completely removable cover for covering the cooking cavity, wherein the removable cover can be selectively mounted relative to the cooking cavity in an open position,
   at least one bracket attached to the removable cover for selectively mounting the removable cover in an open position relative to the cooking cavity, wherein the bracket includes a first portion fastened to the removable cover, and a second portion extending outwardly and downwardly from the from the first portion; and
   at least one slotted opening extending through a flange surrounding the cooking cavity for receiving the second portion of the bracket therein, the second portion having an end that extends directly over the slotted opening when the removable cover is in a closed position on the cooking cavity.

20. The cooking device of claim 19 wherein the removable cover, when mounted relative to the cooking cavity in an open position permits condensation or other matter on an inner surface of the removable cover to drip into the cooking cavity.

21. A cooking device comprising:
   a cooking cavity;
   a completely removable cover for covering the cooking cavity, wherein the removable cover can be selectively mounted relative to the cooking cavity in an open position; and
   at least one bracket attached to the cooking cavity, and at least one corresponding elongated slotted opening extending through a rear sidewall of the removable cover for selectively mounting the removable cover in an open position relative to the cooking cavity.

22. A cooking device comprising:
   a cooking cavity;
   a completely removable cover for covering the cooking cavity wherein the removable cover can be selectively mounted relative to the cooking cavity in an open position; and
   at least one bracket attached to the removable cover, the bracket having a first portion fastened to the cover and a second portion extending outwardly from the first portion, and at least one corresponding bracket attached to a flange surrounding the cooking cavity, the bracket having a first portion fastened to the flange and a second portion extending outwardly from the first portion, with at least one of the brackets having at least one slotted opening extending therethrough for receiving the second portion of the corresponding bracket therein for selectively mounting the removable cover in an open position relative to the cooking cavity.

* * * * *